May 31, 1927.
J. P. BOSLE ET AL
1,630,690
GAUGE
Filed April 16, 1926
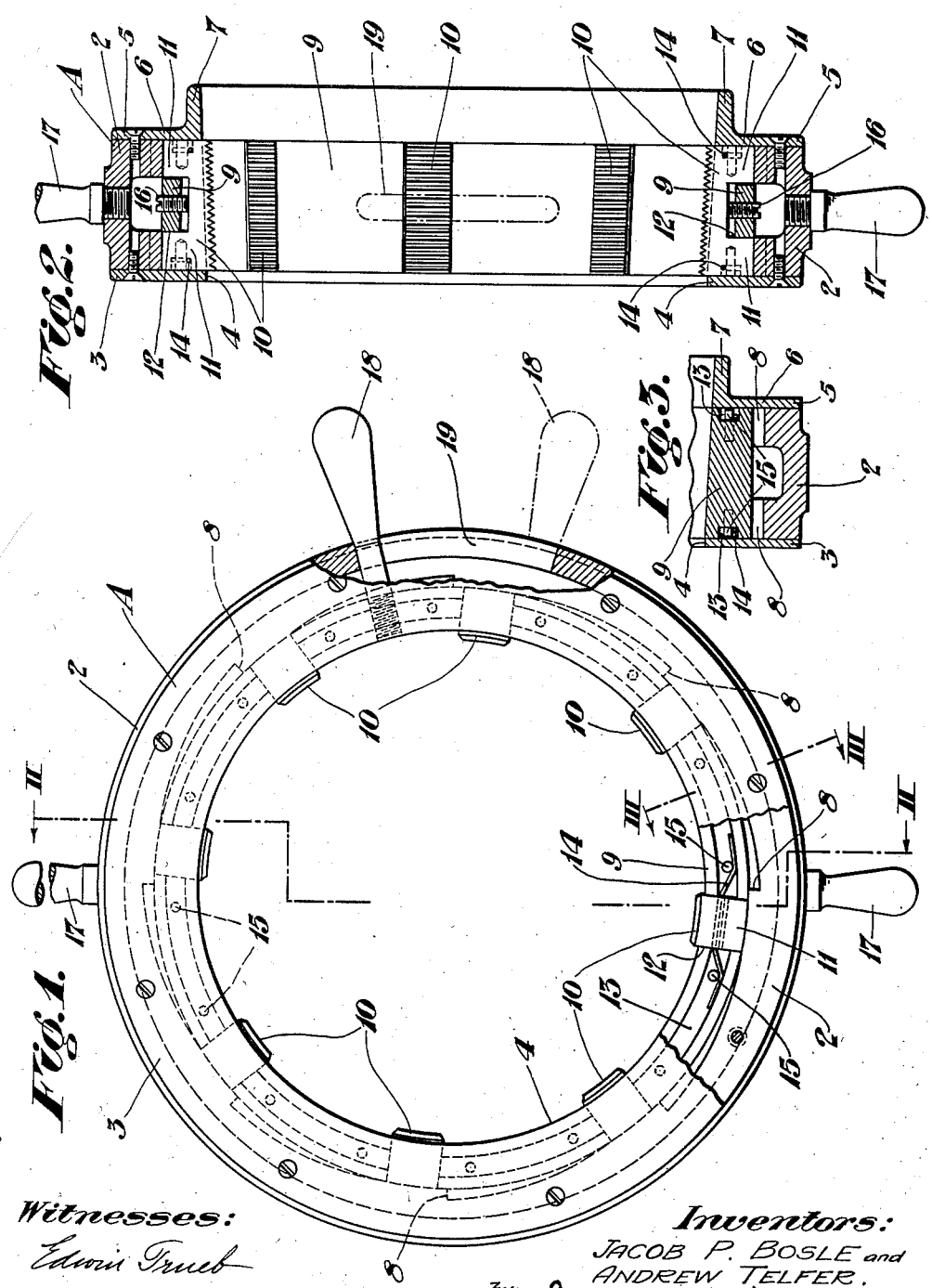
Witnesses:
Edwin Trueb
Inventors:
JACOB P. BOSLE and
ANDREW TELFER.
by: D. Anthony Usina
their Attorney.

Patented May 31, 1927.

1,630,690

UNITED STATES PATENT OFFICE.

JACOB P. BOSLE, OF MOUNT OLIVER, AND ANDREW TELFER, OF PITTSBURGH, PENNSYLVANIA, ASSIGNORS TO NATIONAL TUBE COMPANY, A CORPORATION OF NEW JERSEY.

GAUGE.

Application filed April 16, 1926. Serial No. 102,464.

This invention relates to gauges and more particularly to size ring gauges for gauging threaded pipes, casing ends and the like, and has for its object the provision of a novel form of gauge of this class that can be quickly fitted to and taken from the threaded article without the necessity of threading it into place as heretofore.

Heretofore a gauge coupling or ring has been used for gauging threaded articles like pipe and casing ends, and it has been necessary to screw or thread the gauge coupling along the whole threaded end by hand with the aid of a suitable wrench. About eight turns are necessary to thread the gauge coupling on pipe ends and about sixteen turns are necessary to thread the gauge coupling on casing ends. This operation consumes so much time and requires so much hard labor that one man can only gauge from 160 to 180 ends in a turn of ten hours. In order to insure threads within a tolerance of one turn on pipe and one and one-half turns on casing, it is necessary or at least desirable, to gauge every end, and to do this with the size or gauge couplings heretofore used required a large force of sizers and entailed a considerable labor cost.

The present invention eliminates the necessity for turning the size gauge onto the threaded end to be tested or sized, since it is merely slipped into position and the threaded segments then moved or extended into their proper position, and the gauge ring is then given one to one and one-half turns to screw the ring up tight. In order to remove the gauge ring, the segments are permitted to retract and the ring slipped from the tested end.

In the drawings:

Figure 1 is a front elevation of a gauge ring embodying our invention.

Figure 2 is a sectional view taken on the line II—II of Figure 1.

Figure 3 is a fragmentary section taken on the line III—III of Figure 1.

Referring more particularly to the drawings, the letter A designates the ring-shaped casing as whole, which is composed of a cam ring 2, having a retaining plate 3 secured to its front side face and extending inwardly beyond the inner face of the ring 2 to form a retaining flange 4. A gauge ring 5 is secured to the rear side face of the cam ring 2 and extends inwardly beyond the inner face of the ring 2 to form a retaining flange portion 6. A gauge flange 7 extends rearwardly at right angles to the main body of the gauge ring 5 to indicate the size of the threaded end being gauged by showing at the end the number of threads still exposed on the pipe after the gauge is threaded home on the end being gauged.

The cam ring is provided with a plurality of cam faces 8, the high points of which are ground to form sections of a perfect circle.

A segment ring 9 is loosely mounted within and revolvably movable relative to the cam ring 2 and held in position by the retaining flange portions 4 and 6 of the plate 3 and gauge ring 5, respectively.

A plurality of threaded segments 10 is mounted in suitable recesses in the segment ring 9 and have cam engaging portions 11 projecting through openings 12 in the segment ring 9, so as to engage and ride on the cam faces 8.

The side faces of the segment ring 9 are grooved as at 13, to provide spring receiving grooves. Springs 14 are passed through suitable openings in the segments 10 and have their ends mounted under pins or screws 15 so as to be under constant tension and constantly tend to move the segments outwardly against the cam surfaces 8.

The cam engaging portions 11 of the segments 10 also have their faces ground to a perfect circle of exactly the same size as the circle to which the high points of the cam faces 8 are ground, thus insuring a true bearing and perfect fit.

In order to grind the portions 11 of the segments 10, after the segments are mounted in the segment ring 9 they are set on a threaded master plug, each segment is then tightened by a set-screw 16 and all the portions are then ground while set in this position. After the grinding operation is completed the screws 16 are retracted or removed as desired to permit the free movement and operation of the segments.

A pair of handles 17 is mounted in the cam ring 2 at substantially diametrically opposite points, and a third handle 18 is mounted in the segment ring 9 and extends outwardly through a slot 19 in the cam ring 2.

In operation, the operator moves the handle 18 to rotate the segment ring relative to the cam ring 2 so as to bring the parts 11 of the segments 10 into contact with the low points of the cam faces 8, the complete gauge is then slipped over the threaded end of the article being gauged to approximately the point where the proper number of threads is exposed beyond the gauge flange 7 of the gauge ring 5. The handles 17 and 18 will then be used to move the cam ring 2 and segment ring 9 relative to each other and cause the portions 11 of the segments 10 to engage the high parts of the cam faces 8, thus extending the segments 10 to gauge size. The whole gauge is then screwed up tight, usually requiring one to one and one-half turns. When the whole gauge has been screwed up tight, the gauge ring flange 7 will indicate the size of the threaded end by showing at the end the number of threads still exposed. That is to say, if the specifications call for three exposed threads beyond the end of the coupling, the same condition would be shown with the present gauge ring and three threads would be exposed beyond the flange 7.

To remove the gauge it is only necessary to rotate the gauge casing A counterclockwise as viewed in Figure 1, since the segments will adhere sufficiently to hold the segment ring stationary, thus permitting the cam ring to move relative thereto until the low points of the cam faces 8 are opposite the segments. The segments will then be automatically retracted by the springs 14 and permit the whole gauge to be slipped off the gauged article.

While we have shown and described one specific embodiment of our invention, we do not wish to be limited thereto since various modifications may be made without departing from the scope of our invention as defined in the appended claims.

We claim:

1. A size ring gauge for gauging pipe and casing ends, comprising a ring-like casing, a segment ring mounted in and revolvably movable relative to said casing, segments mounted in said segment ring and movable diametrically thereof, spring means for normally tending to move said segments outwardly, and cam means in said casing adapted to force said segments inwardly when relative movement is had between said casing and segment ring in one direction and to release said segments for outward movement when relative movement is had between said casing and segment ring in the other direction.

2. A size ring gauge for gauging threaded pipe and casing ends, comprising a ring-like casing, a segment ring mounted in and revolvably movable relative to said casing, threaded segments mounted in said segment ring and movable diametrically thereof, spring means for normally tending to move said segments outwardly, and cam means in said casing adapted to force said segments inwardly when relative movement is had between said casing and segment ring in one direction and to release said segments for outward movement when relative movement is had between said casing and segment ring in the other direction.

3. A quick size ring gauge for gauging threaded pipe and casing ends, comprising a casing composed of a cam ring, a retaining ring plate secured to one side face of said cam ring, and a gauge ring secured to the other side face of said cam ring, a segment ring mounted within and revolvably movable relative to said casing, threaded segments mounted in said segment ring and movable diametrically thereof, said cam ring having cam faces formed on the inner face thereof adapted to force said segments inwardly when relative movement is had between said casing and segment ring in one direction and to release said segments for outward movement when relative movement is had between said casing and segment ring in the other direction.

4. A quick size ring gauge for gauging threaded pipe and casing ends, comprising a casing composed of a cam ring, a retaining ring plate secured to one side face of said cam ring, and a gauge ring secured to the other side face of said cam ring, a segment ring mounted within and revolvably movable relative to said casing, threaded segments mounted in said segment ring and movable diametrically thereof, spring means for normally tending to move said segments outwardly, said cam ring having cam faces formed on the inner face thereof adapted to force said segments inwardly when relative movement is had between said casing and segment ring in one direction and to release said segments for outward movement when relative movement is had between said casing and segment ring in the other direction, a handle secured to said casing, and a second handle secured to said segment ring whereby said casing and segment ring may be revolved relative to each other by moving said handles toward or away from each other.

In testimony whereof, we have hereunto signed our names.

JACOB P. BOSLE.
ANDREW TELFER.